(12) United States Patent
Linde et al.

(10) Patent No.: US 11,952,130 B2
(45) Date of Patent: Apr. 9, 2024

(54) STRUCTURAL COMPONENT FOR AN AIRCRAFT WITH INTEGRATED HEATING LAYER AND STRUCTURAL BATTERY

(71) Applicants: Airbus Operations GmbH, Hamburg (DE); Airbus Defence and Space GmbH, Taufkirchen (DE)

(72) Inventors: Peter Linde, Hamburg (DE); Elmar Bonaccurso, Taufkirchen (DE)

(73) Assignees: Airbus Operations GmbH, Hamburg (DE); Airbus Defence and Space GmbH, Taufkirchen (DE)

( * ) Notice: Subject to any disclaimer, the term of this patent is extended or adjusted under 35 U.S.C. 154(b) by 479 days.

(21) Appl. No.: 17/211,967

(22) Filed: Mar. 25, 2021

(65) Prior Publication Data
US 2021/0362860 A1    Nov. 25, 2021

(30) Foreign Application Priority Data

Mar. 27, 2020    (DE) .......................... 102020108485.4

(51) Int. Cl.
*B64D 15/12*        (2006.01)
*H01M 10/658*    (2014.01)
(Continued)

(52) U.S. Cl.
CPC .......... *B64D 15/12* (2013.01); *H01M 10/658* (2015.04); *H05B 3/145* (2013.01); *H05B 3/18* (2013.01);
(Continued)

(58) Field of Classification Search
CPC ................ B64D 15/12; H01M 10/658; H01M 2220/20; H05B 3/145; H05B 3/18; H05B 2214/02
See application file for complete search history.

(56) References Cited

U.S. PATENT DOCUMENTS

| | | | |
|---|---|---|---|
| 5,114,807 | A  | 5/1992  | Rowlette |
| 6,483,087 | B2 | 11/2002 | Gardner et al. |

(Continued)

FOREIGN PATENT DOCUMENTS

| | | |
|---|---|---|
| DE | 102007061548 A1 | 7/2008 |
| DE | 102011119844 A1 | 12/2012 |

(Continued)

OTHER PUBLICATIONS

German Search Report; priority document, Pub date Mar. 9, 2021.

*Primary Examiner* — Rodney A Bonnette
(74) *Attorney, Agent, or Firm* — Greer, Burns & Crain, Ltd.

(57) ABSTRACT

A structural component for an aircraft including at least one heatable component section having a layer structure including an inner base structure, at least one heating layer having carbon allotropes embedded in a matrix material, at least one first group of consecutive layers including at least one anode layer, at least one first insulating layer, and at least one cathode layer having an electroactive coating. The first group of layers are arranged between the inner base structure and the at least one heating layer, and at least one protective layer is arranged outside the heating layer. The first group of layers constitute a structural battery. The at least one anode layer and the at least one cathode layer are electrically connectable with the heating layer.

10 Claims, 3 Drawing Sheets

(51) Int. Cl.
  *H05B 3/14* (2006.01)
  *H05B 3/18* (2006.01)
(52) U.S. Cl.
  CPC ..... *H01M 2220/20* (2013.01); *H05B 2214/02* (2013.01)

(56) References Cited

U.S. PATENT DOCUMENTS

| | | | |
|---|---|---|---|
| 8,752,279 | B2 | 6/2014 | Brittingham et al. |
| 9,511,871 | B2 | 12/2016 | Steinwandel et al. |
| 10,442,540 | B2 | 10/2019 | Strobl et al. |
| 10,607,747 | B1 | 3/2020 | Kinlen et al. |
| 2015/0344138 | A1 | 12/2015 | Wen et al. |
| 2016/0058266 | A1 | 3/2016 | Nygren |
| 2017/0050533 | A1 | 2/2017 | Wei et al. |
| 2017/0271711 | A1* | 9/2017 | Benthien ............. H01M 4/0402 |
| 2017/0332443 | A1 | 11/2017 | Linde |
| 2018/0084613 | A1 | 3/2018 | Hu et al. |
| 2018/0086470 | A1 | 3/2018 | Zhao et al. |
| 2018/0187561 | A1 | 7/2018 | Zhao et al. |
| 2018/0335218 | A1* | 11/2018 | Ray .......................... H05B 3/34 |
| 2018/0370637 | A1 | 12/2018 | Hu et al. |
| 2019/0273225 | A1* | 9/2019 | Sakawaki ............. H01M 10/04 |
| 2019/0334203 | A1* | 10/2019 | Linde ..................... B60L 50/64 |
| 2019/0357312 | A1 | 11/2019 | Linde et al. |

FOREIGN PATENT DOCUMENTS

| | | |
|---|---|---|
| DE | 102018111703 A1 | 11/2019 |
| EP | 1238572 B1 | 2/2007 |
| EP | 2873617 A1 | 5/2015 |
| EP | 3506325 A1 | 7/2019 |
| WO | 2005087589 A1 | 9/2005 |
| WO | 2016144683 A1 | 9/2016 |

* cited by examiner

STRUCTURAL COMPONENT FOR AN AIRCRAFT WITH INTEGRATED HEATING LAYER AND STRUCTURAL BATTERY

CROSS-REFERENCES TO RELATED APPLICATIONS

This application claims the benefit of the German patent application No. 102020108485.4 filed on Mar. 27, 2020, the entire disclosures of which are incorporated herein by way of reference.

FIELD OF THE INVENTION

The invention relates to a structural component for an aircraft, to a method for producing a structural component and to an aircraft having at least one such structural component.

BACKGROUND OF THE INVENTION

Components of aircraft that are directed directly into an incoming flow may cause icing under certain environmental conditions and flight conditions. Numerous devices are known from the prior art, which nevertheless can achieve an ice-free state of these components. On the one hand, devices are known which prevent an initial adhesion of ice (so-called anti-icing). Furthermore, devices are known which can remove already adhered ice (so-called de-icing). The devices may be based on the introduction of heat, such as bleed air taken from compressor stages of a turbojet engine. In addition, devices are known in which, by active deformation of leading edge areas, ice is blasted, such as by pneumatically expandable pads made of an elastomer, by transient magnetic forces at metallic leading edges or the like.

In modern commercial aircraft, the consumption of bleed air is restricted and full abandonment of bleed air is preferred. Therefore, there are also devices that can generate heat in a different way. It is well known to arrange heating mats with electrical resistance heating on an inside of leading edges of flow components to generate and deliver heat locally.

EP 2 873 617 A1 discloses an apparatus for de-icing and/or avoiding ice formation for an aircraft having heat-dissipating means for delivering heat to a surface area of the aircraft which is adapted for line-shaped heat dissipation to produce a predetermined breaking or breaking line in ice accumulating on the surface area.

SUMMARY OF THE INVENTION

It is an object of the invention to provide an alternate anti- or de-icing device for a structural component that is simple to manufacture and that does not significantly add weight to the structural component, into which it is integrated.

A structural component for an aircraft is proposed, the component comprising at least one heatable component section having a layer structure comprising an inner base structure, at least one heating layer having carbon allotropes embedded in a matrix material, at least one first group of consecutive layers comprising at least one anode layer, at least one first insulating layer, and at least one cathode layer having an electroactive coating, the first group of layers being arranged between the inner base structure and the at least one heating layer, and at least one protective layer arranged outside the heating layer, wherein the first group of layers constitute a structural battery, and wherein the at least one anode layer and the at least one cathode layer are electrically connectable with the heating layer.

The structural component has a structure that comprises a plurality of material layers. It is indicated that this layer structure is not necessarily limited to layers of fiber-reinforced plastics, but may also comprise metallic layers. Furthermore, additional layers may be arranged between, under or upon the individual layers, which may also comprise a certain function but are not explicitly named herein.

The inner base structure is intended to achieve at least a fraction of the desired stability of the component. In particular, the inner base structure is designed so that the required mechanical strength is provided almost exclusively by the inner base structure. Depending on the concept of the aircraft, the inner base structure may comprise one or more different materials. Classic metallic structures, fiber composites and combinations thereof are conceivable. The inner base structure may also include a stiffening structure.

The at least one heating layer is capable of producing heat, if an electrical voltage is provided. For this purpose, carbon allotropes, which include several possible variants of carbon material, are embedded into a matrix material. This enables the provision of an electrically conductive, but very thin layer, which allows a large-scale introduction of heat by applying the electrical voltage. The at least one heating layer may have a particularly small thickness, which minimizes additional weight for the structural component. The use of carbon allotropes nevertheless results in a particularly advantageous generation of heat when the at least one heating layer is subjected to the electrical voltage. The at least one heating layer may include a single fabric layer. Alternatively, the at least one heating layer may also include a layer of woven or non-woven allotropes having a thickness that corresponds to the thickness of a single layer of fabric.

The at least one first group of consecutive layers constitutes a structural battery that is arranged on the base structure and supports the structural function of the structural component. For example, the anode layer and the cathode layer may be realized in the form of carbon fiber layers embedded in a plastic matrix. The cathode layer may exemplarily comprise carbon fibers provided with an electroactive coating. This may particularly be an ion-donating coating. Particularly, the cathode active coating may be a lithium-containing transition metal oxide or a lithium-containing transition metal phosphate when using a lithium-ion based battery. These substances are able to store lithium ions reversibly and release them again. The coating may be done by soaking, dipping or spraying with suitable solution, but other variants are not excluded. For example, the coating may comprise $LiFeO_2$ and/or $LiFePO_4$.

Between the cathode layer and the anode layer, the first insulating layer is arranged, which may comprise an ion-permeable separating layer for electrical insulation. It allows the transfer of, e.g., lithium ions to enable an electrochemical battery process. The integration of the structural battery into a structural component of an aircraft allows to include an additional function substantially without adding to the weight of the aircraft.

The at least one protective layer, which is arranged outside the at least one heating layer, mainly serves to protect the individual layers against erosion and other mechanical impairments. It may simply comprise a paint, but may also include a metallic protective layer or the like. It is clear that the at least one protective layer may also comprise several layers.

The structural battery in form of the at least one first group of consecutive layers is electrically connectable to the at least one heating layer. The efficiency of an integrated anti- or de-icing function is raised, as the structural battery constantly dissipates heat during discharging, which adds to the heat emitted by the at least one heating layer. By the heat dissipation of the structural battery alone, a raised temperature is achieved that reaches a converged value after some time of operation. Tests have shown that a few layers away from a cathode layer, a temperature increase of 35° C. is achievable. This supports the prevention of ice build-up on, e.g., leading edges (anti-icing). In case of a demand for melting of built-up ice (de-icing), the already warmer base temperature will help achieve a fast de-icing by means of an additional source, such as, e.g., a layer of multi-functional coated carbon fibers in the form of the at least one heating layer.

Consequently, the use of a structural battery in a heatable component section of a structural component supports an anti-icing function solely by a discharging function and substantially without an additional weight of the aircraft.

In an advantageous embodiment, a second insulating layer is arranged between the at least one heatable layer and the first group of layers. Thus, the first group of layers is electrically insulated from the at least one heating layer. The second insulating layer may be provided by a layer of non-conductive fibers embedded in a matrix material. For example, the fibers may be glass fibers.

It is preferred that the second insulating layer is an electrical insulating layer. To support the above-described heating function of the structural battery a thermal insulation should be avoided as much as possible. For example, the second insulating layer may be limited to a single material layer, e.g., from a glass fiber reinforced plastic material. It may be feasible to balance the producible heat from the at least one heating layer and the heat that is dissipated from the structural battery in such a manner that the at least one heating layer cannot produce a heat flow that leads to influencing the capacity of the structural battery.

Another advantageous embodiment further comprises a third insulating layer arranged between the protective layer and the at least one heating layer, wherein the third insulating layer is an electrical insulating layer. Also, the third insulating layer should not prevent the transfer of heat, as it is arranged directly adjacent to the protective layer and the environment of the heatable section. It is advantageous if the third insulating layer comprises carbon fibers having an insulating coating. Material continuity is improved within the complete layer structure and the stability is slightly increased compared to glass fibers. In particular, in the position of the third insulating layer delamination can thus be avoided.

To further improve the heat transfer from the at least one heating layer to the environment of the heatable section, the third insulating layer comprises aluminum nitride and/or boron nitride. These materials are electrically insulating and provide excellent heat transfer properties.

Furthermore, the inner base structure may comprise a carbon fiber reinforced plastic. In particular, the matrix material may be a polymer or a resin system in which the reinforcing fibers are embedded. These may be realized in the form of fabrics or other arrangement of fibers, which are provided as one or more layers and according to the expected direction of forces. It is particularly useful to use reinforcing fibers that run in multiple layers and in multiple directions. The fiber directions may be adapted to the required mechanical properties. Alternatively, layers of non-woven fibers or fiber layers may be used. The fibers may have one or more discrete fiber directions or be implemented omnidirectionally to achieve quasi-isotropic properties. In addition, one or more layers of a metallic material may be provided. The design of the structural component according to the invention allows the manufacture of the individual layers by substantially conventional methods for producing a composite component. The layers are embedded in a matrix material and can be cured together to form a monolithic component.

It is advantageous if the at least one heating layer comprises coated carbon fibers embedded in the matrix material.

Furthermore, the first group of layers may comprise a fourth insulating layer at a side facing the inner base structure, wherein the fourth insulating layer is an electrical and thermal insulating layer. The heat emitted by the structural battery thus does not act onto the base structure. For example, the fourth insulating layer may comprise an arrangement of several layers that are electrically insulating, thus providing a certain thermal insulation.

In another exemplary embodiment, the first group of layers comprises two current collector layers as two opposed and outermost layers. The collector layers may be referred to as a cathode collector layer and an anode collector layer. Both of these layers may exemplarily comprise a structure of carbon allotropes, such as carbon fibers, carbon nanotubes or graphene. For example, the collector layers may be formed by a porous mat of unwoven carbon nanotubes, which allows a simple integration of this into a common manufacturing process for a composite component. The individual carbon nanotubes adhere together by the van der Waals forces and thus lead to a quasi-isotropic tensile behavior. Thus, a particularly advantageous replacement of an otherwise metallic collector layer material is achieved. The collector layers may also lead to a significantly low material discontinuity with adjacent carbon fiber layers, which prevents chemical corrosion incompatibility of aluminum-based electrodes. Furthermore, the stability of the structural component is improved.

As indicated above, the current collector layers may comprise graphene, which comprises advantageous mechanical properties as well as high thermal conductivity, which offers the use of graphene at least for one of the collector layers that is opposite to the inner base structure.

Furthermore, the invention relates to a method for producing a structural component, in particular, a structural component according to the above description, comprising the steps of providing an inner base structure, applying a first group of consecutive layers comprising at least one anode layer, at least one first insulating layer, and at least one cathode layer having an electroactive coating, the first group of layers being arranged between the inner base structure and at least one heating layer, on the inner base structure, applying the at least one heating layer in the form of a matrix material with carbon allotropes, and applying a protective layer.

The method may further comprise the step of curing at least the at least one heating layer and the first group of layers as a final step or as a step prior to applying the protective layer.

Additionally, the method may further comprise the step of applying a third insulating layer prior to applying the protective layer.

The invention also relates to an aircraft, comprising at least one structural component according to the above description, wherein the at least one anode layer and the at least one cathode layer are couplable with a switching device for selectively connecting the at least one heating layer to the at least one anode layer and the at least one cathode layer.

Also, the heatable component section is preferably arranged on a leading edge of the structural component.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form an object of the invention individually and in arbitrary combination regardless of their composition in the individual claims or their references to other claims. Furthermore, identical or similar objects are identified by the same reference symbols in the figures.

DETAILED DESCRIPTION OF THE PREFERRED EMBODIMENTS

Figure 1:
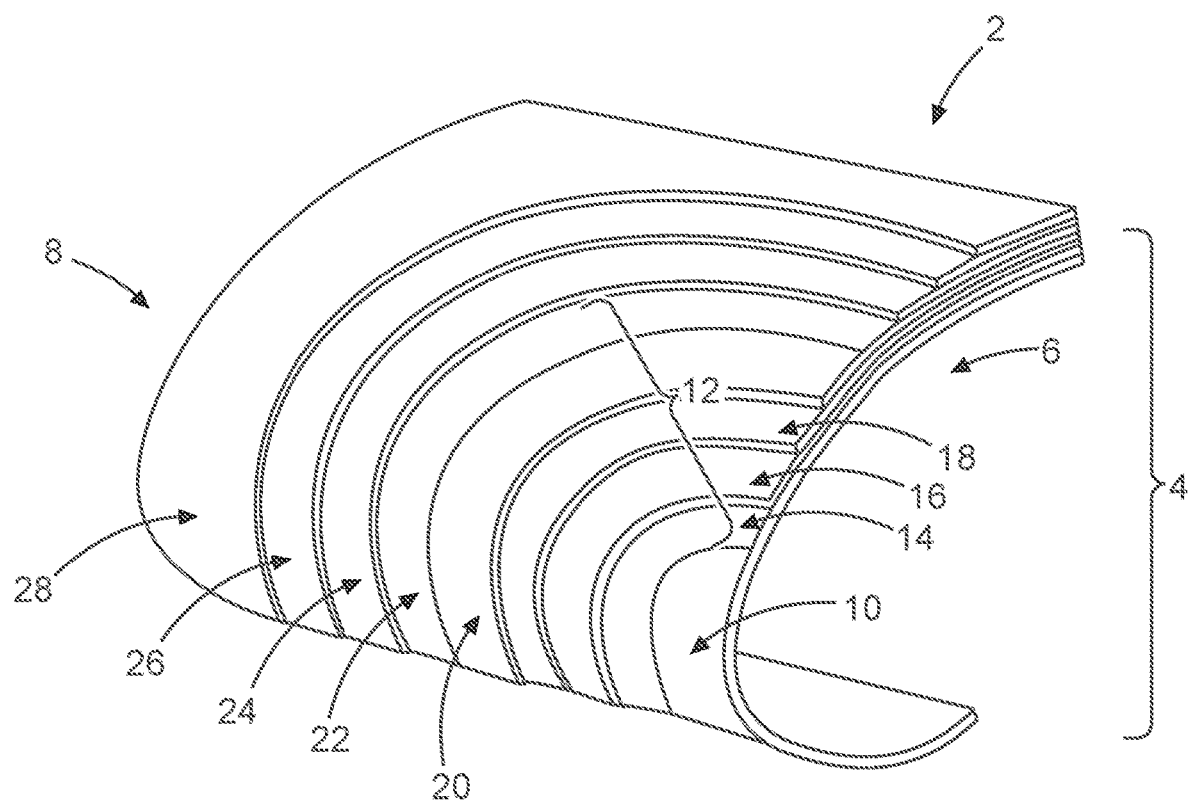
FIG. 1 shows a sectional view of the structural component.

FIG. 1 shows a part of a structural component 2, which is exemplarily shown as a wing or a leading-edge section of a wing of an aircraft with a significant curvature. However, other variants of structural components 2 are possible. The structural component 2 comprises a heatable component section 4, which is exemplarily directly located at a leading edge. It comprises a first side 6, which comprises an interior side, as well as a second side 8, which comprises an exterior side. At the first side 6, the structural component 2 comprises an inner base structure 10, which may be realized in various ways and it is merely shown schematically. It may be made of different materials, e.g., metallic materials and/or fiber-reinforced composite materials and combinations thereof, for example, so-called "Fiber Metal Laminates". The inner base structure 10 may comprise a plurality of layers and it may be dimensioned to carry the majority of the expected loads during operation of the aircraft. Thus, it may comprise a larger extension in a thickness direction than shown here.

On the inner base structure 10, a first group 12 of consecutive layers is arranged, which first group 12 constitutes a structural battery. Directly on top of the inner base structure 10, a first current collector 14 is arranged, which may comprise a graphene layer embedded in a matrix material. An anode layer 16 is arranged on the first current collector 14. It comprises carbon allotropes, such as carbon fibers, embedded in a matrix material and in direct contact with the first current collector 14. A first insulating layer 18 is attached to the anode layer 16 and provides an electrical insulation. Also, it is ion-permeable, such that lithium ions are able to pass the first insulation layer 18 to enable an electrochemical battery process. For example, it may comprise a glass fiber reinforced plastic material. On the first insulation layer 18, opposite to the anode layer 16, a cathode layer 20 is provided. It may be made by the same material as the anode layer 16, e.g., carbon fibers embedded in a matrix material. In addition, the carbon fibers are coated with an electroactive material, such as $LiFeO_2$ and/or $LiFePO_4$ or another lithium-containing transition metal oxide or a lithium-containing transition metal phosphate, if the structural battery is lithium-ion based. These substances are able to store lithium ions reversibly and release them again. On top of the cathode layer 20, a second current collector 22 is attached. Together, these layers 14 to 22 provide the function of a structural battery by using the described layer structure. However, due to the use of mainly carbon allotropes in a matrix material, the structural battery significantly supports the stability of the structural component 2.

The first group 12 of layers is covered by a second insulating layer 24, which provides an electrical insulation and thus is a dielectric layer. However, if desired, it also provides a thermal insulation, such that the structural battery is protected from temperatures in excess of 60° C., which is needed for anti-icing. The second insulation layer 24 is exemplarily realized in the form of one or more layers of glass fiber reinforced plastic material. Also, carbon fibers with an electrical insulating coating may be embedded in a matrix material to form the second insulating layer 24. The required heat insulation may be controlled by suitably dimensioning the layer thickness of the second insulating layer 24.

Further to the second side 8, a heating layer 26 is provided. For example, it comprises at least one layer of carbon fiber reinforced plastic material. However, the carbon fibers may comprise a coating for enhancing the conductivity. In addition or as an alternative thereto, the heating layer 26 comprises a mat of woven or non-woven carbon nanotubes embedded in a matrix material.

At an outermost position, i.e., at the second side 8, a protective layer 28 is provided. The protective layer 28 may simply be a covering paint. However, for erosion protection the protective layer 28 is exemplarily provided in a form of a metallic foil, such as hardened aluminum, steel or titanium.

The heating layer 26 is selectively connectable to the first current collector 14 and the second current collector 22, such that it is operable through consuming energy delivered by the structural battery. Hence, only very short electrical connections are required, which may mainly extend through the structural component 2 in a thickness direction.

Figure 5:
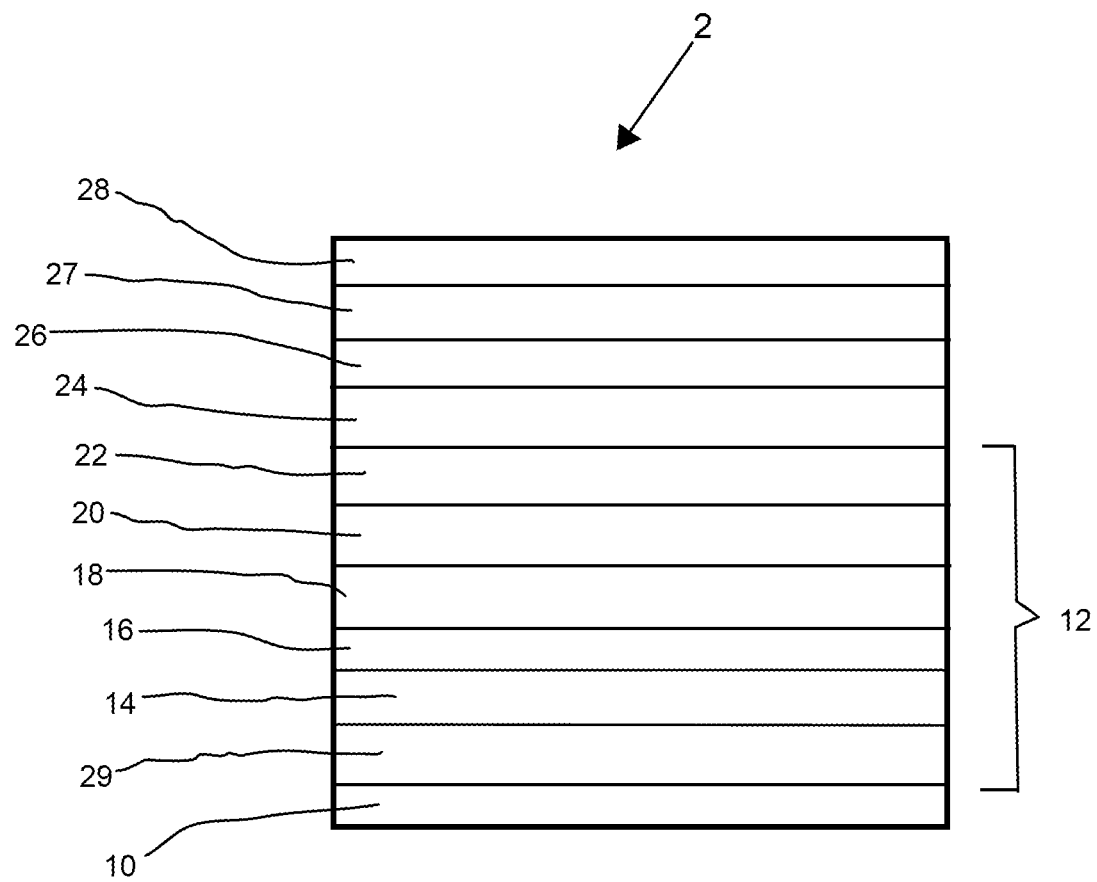
FIG. 5 shows a side view of a structural component.

As shown in FIG. 5, a third insulating layer 27 may be arranged between the protective layer 28 and the at least one heating layer 26, wherein the third insulating layer 27 is an electrical insulating layer. Also, the third insulating layer 27 should not prevent the transfer of heat, as it is arranged directly adjacent to the protective layer 28 and the environment of the heatable section. It is advantageous if the third insulating layer 27 comprises carbon fibers having an insulating coating. Material continuity is improved within the complete layer structure and the stability is slightly increased compared to glass fibers. In particular, in the position of the third insulating layer 27 delamination can thus be avoided.

To further improve the heat transfer from the at least one heating layer 26 to the environment of the heatable section, the third insulating layer 27 comprises aluminum nitride and/or boron nitride. These materials are electrically insulating and provide excellent heat transfer properties.

Furthermore, the first group of layers 12 may comprise a fourth insulating layer 29 at a side facing the inner base structure 10, wherein the fourth insulating layer 29 is an electrical and thermal insulating layer. The heat emitted by the structural battery thus does not act onto the base structure 10. For example, the fourth insulating layer 29 may comprise an arrangement of several layers that are electrically insulating, thus providing a certain thermal insulation.

Figure 2:
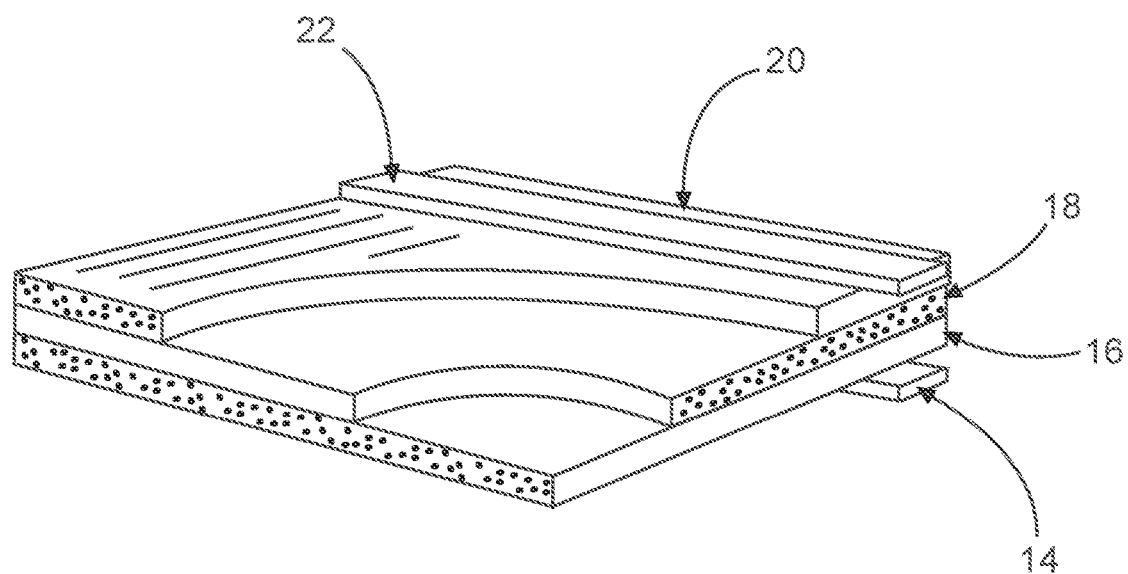
FIG. 2 shows a detailed section view of the first group of layers.

FIG. 2 shows the structural battery in further detail. Here, the simple layout is clearly apparent. The whole structural battery in form of the first group 12 of layers may be realized in five material layers, which may correspond to five material layers of common structural components, with slight modifications. They inherently contribute to the structural stability and provide a clear advantage in that relatively large surfaces may be equipped as a structural battery for providing an energy source for the heating layer 26.

Figure 3:
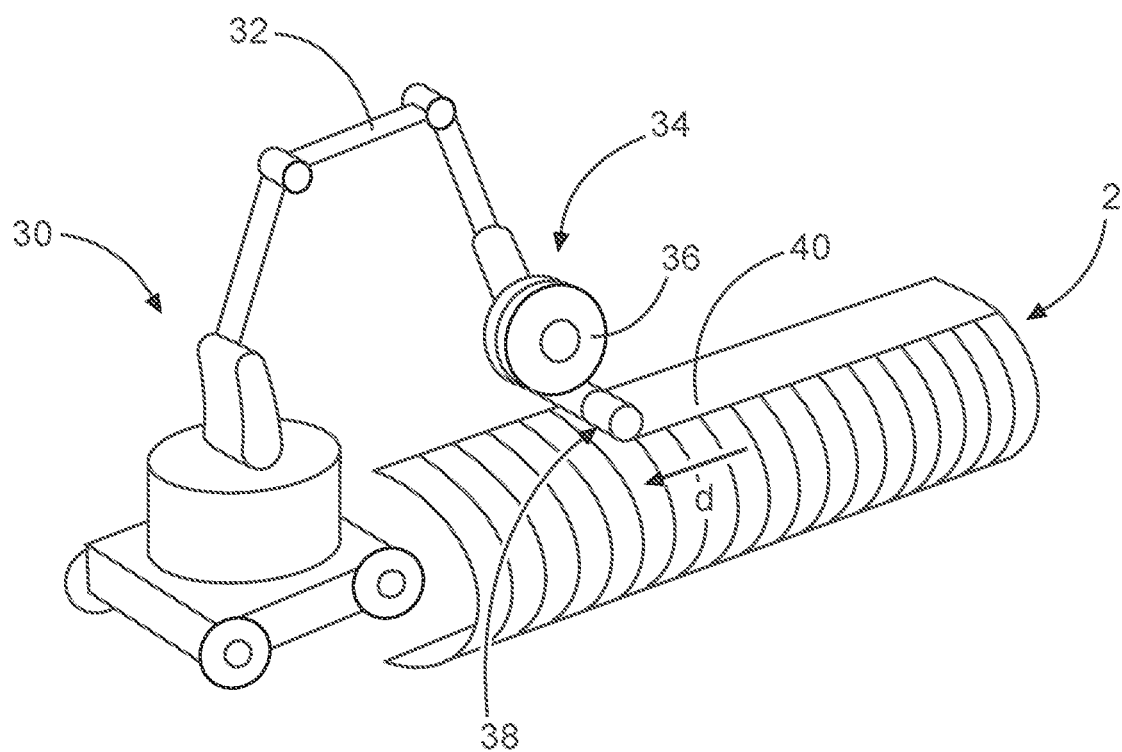
FIG. 3 shows a manufacturing device.

A further particular advantage of this design is that conventional, automated manufacturing methods and manufacturing apparatuses may be used to manufacture the structural component 2. For example, FIG. 3 shows the structural component 2 being manufactured through an automated manufacturing device 30, which is shown having a robot arm 32, which carries an automated deposition head 34. For example, the deposition head 34 comprises a material spool 36, on which material layers are arranged. Through a guide roller 38 the material layers provided by the material spool 36 are pressed onto the mold or previous layers of the structural component 2 to be manufactured. By moving along a depositing direction d, a material web 40 is deposited. This process may be carried out for each of the material layers described above.

The material web 40 may be a pre-impregnated web or it may comprise dry fibers, which are impregnated after all layers have been deposited. After all layers are provided, the arrangement of layers is cured to form the structural component 2. For this purpose, the molding tool (not shown) can be moved into an autoclave and be heated according to the characteristics of the material.

Figure 4:
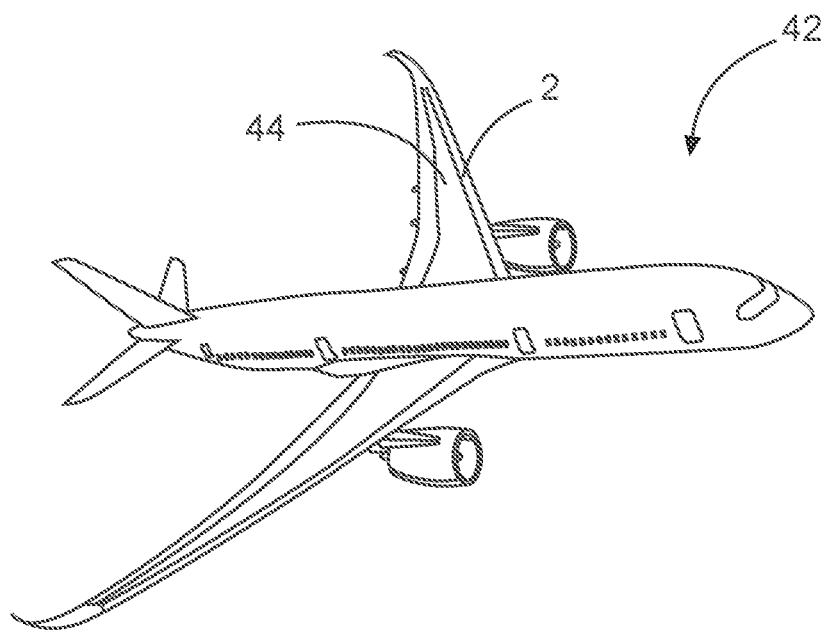
FIG. 4 shows an aircraft having such a structural component.

FIG. 4 shows an aircraft 42 having structural components 2, which are exemplarily designed in the form of leading edges of wings 44. These may then selectively be heated by the heating layer 26, which are provided with electrical energy from the structural battery arranged in the same component 2. These also contribute to the elevated temperature.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS

2 Structural component
4 heatable component section
6 first side
8 second side
10 inner base structure
12 first group of layers
14 first current collector
16 anode layer
18 first insulation layer
20 cathode layer
22 second current collector
24 second insulating layer
26 heating layer
28 protective layer
30 manufacturing device
32 robot arm
34 deposition head
36 material spool
38 guide roller
40 material web
42 aircraft
44 wing
d deposition direction

The invention claimed is:

1. A structural component for an aircraft, comprising:
at least one heatable component section having a layer structure comprising:
an inner base structure,
at least one heating layer having carbon allotropes embedded in a matrix material,
at least one first group of consecutive layers comprising at least one anode layer, at least one first insulating layer, and at least one cathode layer having an electroactive coating, the first group of layers being arranged between the inner base structure and the at least one heating layer, and
at least one protective layer arranged outside the heating layer,
wherein the first group of layers constitute a structural battery, and
wherein the at least one anode layer and the at least one cathode layer are electrically connectable with the heating layer.

2. The structural component according to claim 1, wherein a second insulating layer is arranged between the at least one heating layer and the first group of layers.

3. The structural component according to claim 2, wherein the second insulating layer is an electrical insulating layer.

4. The structural component according to claim 1, further comprising a third insulating layer arranged between the protective layer and the at least one heating layer, wherein the third insulating layer is an electrical insulating layer.

5. The structural component according to claim 4, wherein the third insulating layer comprises at least one of aluminum nitride or boron nitride.

6. The structural component according to claim 1, wherein the inner base structure comprises a carbon fiber reinforced plastic.

7. The structural component according to claim 1, wherein the at least one heating layer comprises coated carbon fibers embedded in the matrix material.

8. The structural component according to claim 1,
wherein the first group of layers comprises a fourth insulating layer at a side facing the inner base structure, and
wherein the fourth insulating layer is an electrical and thermal insulating layer.

9. The structural component according to claim 1, wherein the first group of layers comprise two current collector layers as two opposed and outermost layers.

10. The structural component according to claim 9, wherein the current collector layers comprise graphene.

* * * * *